United States Patent [19]

Fukui et al.

[11] Patent Number: 5,754,433
[45] Date of Patent: May 19, 1998

[54] COMPUTER-AIDED DESIGN SYSTEM

[75] Inventors: Yukio Fukui; Hiroshi Yokoi; Makoto Shimojo, all of Tsukuba, Japan

[73] Assignee: Director-General of Agency of Industrial Science and Technology, Tokyo, Japan

[21] Appl. No.: 622,422

[22] Filed: Mar. 27, 1996

[30] Foreign Application Priority Data

Jun. 23, 1995 [JP] Japan .................... 7-157401

[51] Int. Cl.$^6$ .................... G05B 19/00; G06F 17/50; G08C 21/00
[52] U.S. Cl. ............. 364/474.24; 364/190; 364/474.28; 364/474.29; 318/561; 318/568.17; 318/566; 318/628; 414/5; 414/6; 414/909; 345/433; 345/441; 345/16; 345/133; 345/161; 345/163; 395/80; 395/95
[58] Field of Search ............... 364/474.24, 190, 364/424.28–424.29; 318/560, 561, 568.17, 625, 628, 632; 128/782, 739, 744; 414/5, 6, 909; 395/80, 95, 99; 345/16, 24, 133, 145, 161, 163, 433, 440–442

[56] References Cited

U.S. PATENT DOCUMENTS

| | | | |
|---|---|---|---|
| 3,919,691 | 11/1975 | Noll | 395/119 |
| 5,021,969 | 6/1991 | Okamura et al. | 395/99 |
| 5,056,038 | 10/1991 | Kuno et al. | 395/95 |
| 5,116,180 | 5/1992 | Fung et al. | 414/5 |
| 5,264,768 | 11/1993 | Gregory et al. | 318/561 |
| 5,329,276 | 7/1994 | Hirabayashi | 340/870.31 |
| 5,335,557 | 8/1994 | Yasutake | 73/862.043 |
| 5,381,805 | 1/1995 | Tuckett et al. | 128/739 |
| 5,389,865 | 2/1995 | Jacobus et al. | 318/568.11 |
| 5,396,266 | 3/1995 | Brimhall | 345/161 |
| 5,412,770 | 5/1995 | Yamashita et al. | 345/442 |
| 5,473,235 | 12/1995 | Lance et al. | 318/561 |
| 5,555,894 | 9/1996 | Doyama et al. | 128/782 |

FOREIGN PATENT DOCUMENTS

| | | |
|---|---|---|
| 0 489 469 A1 | 6/1992 | European Pat. Off. . |
| 0 653 725 A3 | 5/1995 | European Pat. Off. . |
| 6-40339 | 5/1994 | Japan . |

*Primary Examiner*—James P. Trammell
*Assistant Examiner*—Tuan Q. Dam
*Attorney, Agent, or Firm*—Sterne, Kessler, Goldstein & Fox, PLLC

[57] ABSTRACT

The computer-aided design system of the present invention is characterized in that a grasping force sensor 4 is mounted on that operating bar 3 at the front end of a manipulator 1 which is grasped directly and operated by an operator, and that the mechanical response characteristics of the system are varied on the basis of an output from the grasping force sensor 4. That is, the rigidity on the part of the manipulator is increased in response to a high grasping force during operation, since the rigidity of the hand is also high; and the rigidity on the part of the manipulator is decreased for a low grasping force during operation, since the rigidity of the hand is also low. In scenes in which a space on a computer screen defining no shapes is crossed by a cusor on the screen, a weak grip will lower the rigidity on the part of the manipulator, thus achieving the feeling of a smooth operation. If a slight and precise change in the shape on the screen is desired, a firm grip will make the rigidity of the manipulator high, thus achieving meticulous actions of the operating bar with the same external force.

3 Claims, 3 Drawing Sheets

COMPUTER-AIDED DESIGN SYSTEM

BACKGROUND OF THE INVENTION

1. Field of the Invention

A computer-aided design system (the CAD system) is used in the designing of industrial products for which shape designs are important factors such as car bodies, and various molds, etc.. This invention relates to feeding of a three-dimensional shape information into the CAD system. More specifically, it relates to the improvement of control stability in the CAD system equipped with a tactile feedback mechanism for shape information feeding.

2. Description of the Prior Art

With the conventional CAD system, it has been common practice to feed information of a shape having free form surfaces into the computer by a three-dimensional measuring device or the like, and then make minor changes to the shape on the screen in a conversational mode by use of a mouse or the like. However, this operation imposes too heavy load on the eye. Thus, an improvement by which to provide the operating hand with touch information on an object to be designed, and shape information, such as shape itself, information on the hardness of the material, has been proposed to make operations, such as shape corrections, easier and more accurate (Japanese Patent Application Publication No. 40339/1994).

According to the above method, behaviors of operating means are stable when the operating means is contacted the shape defined on the screen via operating hand and exert force on its surface. When the operating hand is freely moved in a space where it touches no shape on the screen, on the other hand, the head of the operating means is controlled in a direction in which the force manually exerted on the operating means is nullified. If the operating means responds slowly on this occasion, the operator feels the operating means very heavy, and the operating performance declines. If the response is quick, by contrast, the nonlinear mechanical characteristics of the operating hand cause uncomfortable vibrations to occur spontaneously at the head of the operating means, thus lowering the operating performance. The response of the operating means, whether slow or quick, is disadvantageous. The mechanism of vibrations in the case of quick response is the discrepancy in characteristics between the machine and the human, namely, that the vibration characteristics on the part of the machine are constant, while the mechanical vibration characteristics of the operator's hand that operates the machine is not constant. That is, the operating hand, when viewed from the machine's side, can be regarded as a spring with mass and damper. The mechanical characteristics of this spring vary with the magnitude of force applied by the operator.

SUMMARY OF THE INVENTION

The technical subject facing the present invention is to improve the operating performance and control performance of the CAD system by enhancing the consistency of mechanical characteristics between the human and the machine. This is aimed at obtaining a natural feeling of operation, using the operating means, that the operator's actions are faithfully followed, whether operation by the human hand exerts a force on a virtual surface on the computer screen, or it exerts minimal force as in motion in a free space on the screen.

To realize this subject, the CAD system of the present invention comprises a three-dimensional shape input device for feeding into the computer three-dimensional shape information on an object to be designed; a grasping force sensor mounted on the three-dimensional shape input device; a manipulator connected to the three-dimensional shape input device and driven by a servo mechanism; a display for visualizing a designing process to be performed via the three-dimensional shape input device; and a controller which is supplied with a signal on a grasping force, measured by the grasping force sensor, during feeding by the three-dimensional shape input device, and which varies the response gain of the servo mechanism of the manipulator on the basis of the signal.

Based on measurements by the grasping force sensor, the controller controls the rigidity on the part of the manipulator so as to increase in response to a high grasping force during operation, since the rigidity of the operating hand is also high; or controls the rigidity on the part of the manipulator so as to decrease for a low grasping force during operation, since the rigidity of the operating hand is also low.

In the above-described structure, the three-dimensional shape input device may have an operating control bar, which may have the grasping force sensor at its front end.

One may possibly feed a three-dimensional shape information into the CAD system to form the three-dimensional shape on the computer screen, and then correct the three-dimensional shape. During work in which the shape already defined in the system is traced on the screen using an operating bar, or part of the shape is revised, the operating hand as well as the cursor on the screen will always be moved tangentially with the hand being pressed against the defined shape. Thus, active force resulting from servo deviations and the force applied manually balance with each other, thereby the operating bar moves stably.

In such scenes, or scenes in which the operating hand as well as the cursor on the screen crosses a space defining no shapes, a weak grip on the operating bar will lower the rigidity on the part of the manipulator, thus achieving the feeling of a smooth and light operation of the operating bar. If a slight and precise change in the shape is desired, a firm grip on the operating bar will make the rigidity of the manipulator high, thus achieving meticulous actions of the operating bar with the same external force.

During a free movement of the operating hand in a space, for example, vibrations of the operating bar are likely to occur because of too easy a movement. In this case, a firm grip on the operating bar could increase rigidity of the operating bar, suppressing vibrations thereof. Since a firm grip and a weak grip on the operating bar are consistent with a natural feeling of operation, the operator will not have much difficulty in performing operations.

Hence, the present invention not only detects the operator's manual force to carry out control of motion of the operating hand as well as the cursor on the screen in a direction in which the force becomes zero; but it also varies the apparent rigidity of the operating bar (mechanical response characteristics) based on his grasping force on the operating bar, a manipulated variable reflecting his will, thereby permitting easier operations of the operating bar following the operator's intentions faithfully.

The above and other objects, effects, features and advantages of the present invention will become more apparent from the following description of an embodiment thereof taken in conjunction with the accompanying drawings.

DETAILED DESCRIPTION OF PREFERRED EMBODIMENT

The embodiment of the present invention will be described with reference to accompanying drawings.

Figure 1:
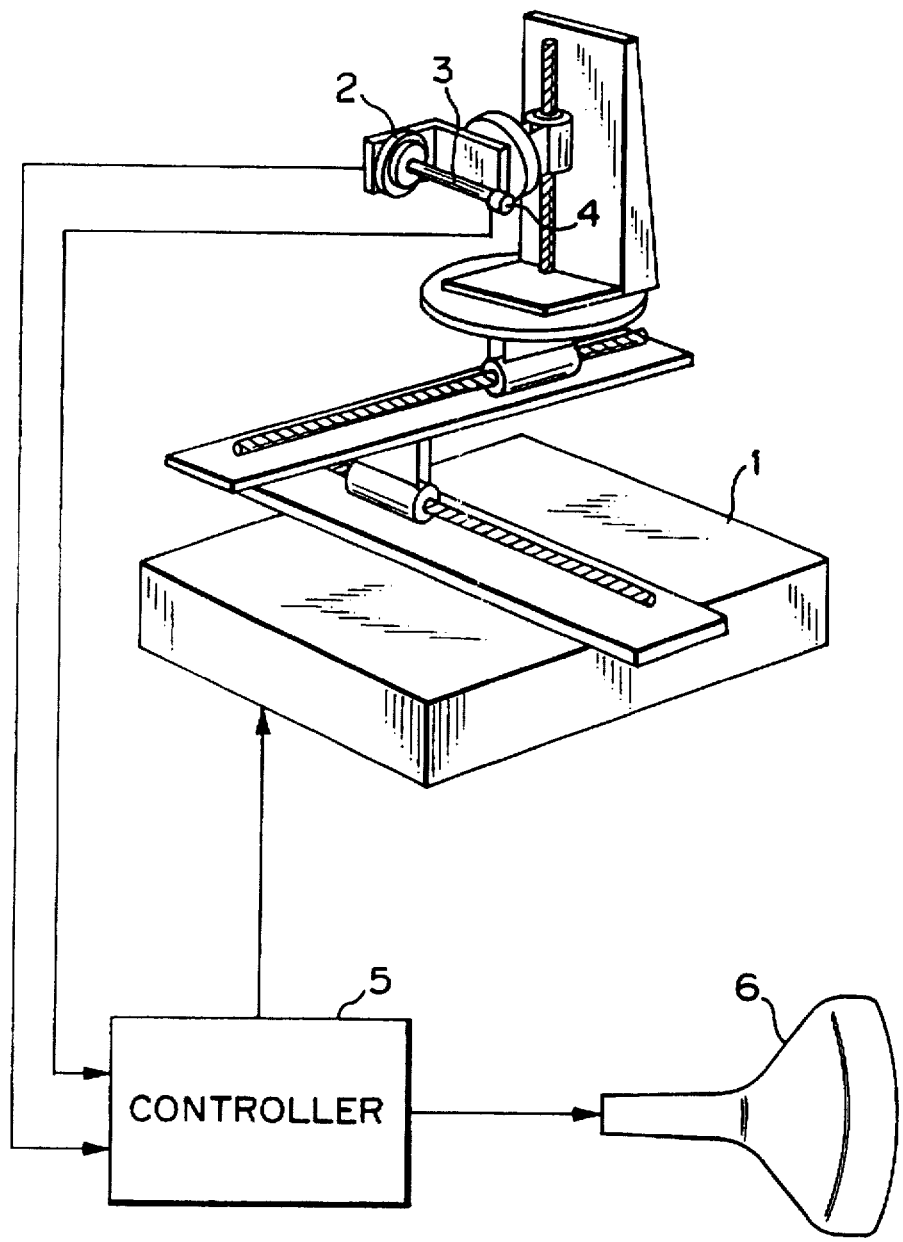
FIG. 1 is an entire block diagram of the CAD system according to the present invention.

FIG. 1 shows an example of the CAD system of the present invention which processes three-dimensional shape information. In FIG. 1, the numeral 1 denotes a six-degree-of-freedom manipulator, 2 a six-axis force sensor, 3 an operating bar, and 4 a grasping force sensor. These members constitute a three-dimensional shape input device. The numeral 5 denotes a controller for performing the control of the entire CAD system, including driving control of the manipulator 1 based on a grasping force applied to the operating bar 3, a feature of the present invention. The controller 5 is composed of a servo mechanism and a workstation, a personal computer, or the like to define the shape. The numeral 6 stands for a display, which shows the results of CAD.

With the design system illustrated in FIG. 1, the operating bar 3 is attached via the six-axis force sensor 2 to a front portion of the manipulator 1 capable of achieving motions with six degrees of freedom (three translational motions, and rotational motions about three axes). The operating bar 3 is equipped with the grasping force sensor 4 capable of measuring a grasping force applied thereto. The force sensor 2 and the operating bar 3 attached to the front portion of the manipulator 1 can make motions with six degrees of freedom by the action of the driving mechanism of the manipulator 1 under the control of the controller 5. Thus, the position and the orientation of the portion where the operating bar is mounted, the force sensor 2, can be managed by the controller 5. This position and orientation can be indicated as a cursor, or an operating hand, on the display 6. When the operator grasps the operating bar 3 along with the grasping force sensor 4 to apply a force in an arbitrary direction, the direction and magnitude of the force are detected by the force sensor 2. This information is transmitted to the controller 5. Inside the controller 5, the output from the force sensor 2 is transformed to an acceleration value to update the position and orientation of the force sensor 2.

If the update is allowed, information on the new position and orientation is sent to the manipulator 1, thereby causing the manipulator 1 to generate a shifting and rotating motion so that the force sensor 2 will come to the new position. That is, unless the position of the force sensor 2 is close to the shape already defined and the direction of the force detected there crosses the shape, the controller 5 determines a control signal for moving the operating bar 3 as well as the force sensor 2 in the direction of the applied force until the output from the force sensor 2 will become zero, whereafter the controller 5 sends this signal to the manipulator 1. As a result, the servo system is caused to follow the operator's manual movement so as not to produce counterforce. Its trajectory information leads to define a shape.

If the force sensor 2 thoroughly approaches the already defined shape and is operated such that the direction of its force crosses this shape, on the other hand, a control signal for somewhat suppressing the movement of the manipulator 1, even if it moves the operating bar 3 in the direction of the force applied, is determined by the controller 5, and this signal is supplied to the manipulator 1.

Figure 2:
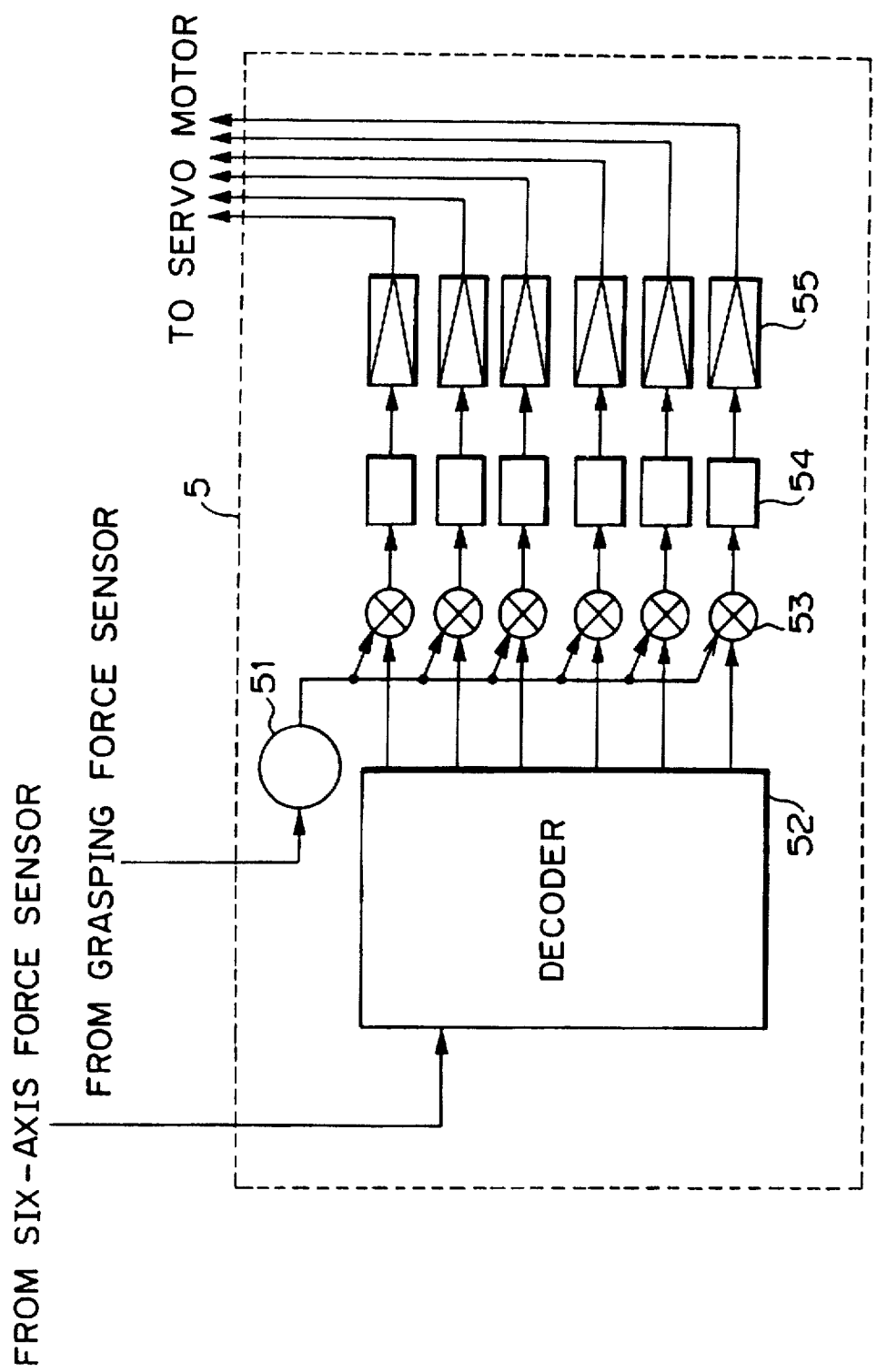
FIG. 2 is a block diagram for illustrating the internal functions of the controller of the CAD system.

The internal functions of the controller 5 are described in more detail in FIG. 2. An encoded signal from the six-axis force sensor 2 is decomposed by a decoder 52 into respective six-axis components. The grasping force signal from the grasping force sensor 4 is feeded into a signal characterizer 51, where level conversion for making a larger grasping force a smaller output is performed. The output from the signal characterizer 51, together with the six-axis force sensor outputs from the decoder, is feeded into a multiplier 53, where the results of multiplication of the two kinds of signals are feeded into a voltage-frequency converter 54. An output from it is a modulation of pulse frequency, which is feeded into a servo amplifier (servo driver) 55. An output from the servo amplifier 55 is an electric current which drives servo motors corresponding to the respective six axes.

According to this configuration, the movement of the servo system is controlled at a constant rate in the direction of the normal to the surface of the already defined shape, whereby the operator's hand is given a tactile feedback sense of as if touching the surface of the shape actually.

The state of control is slightly different between the action of moving the cursor freely in a space on the screen, and the action of tracing the surface of the already defined shape on the screen. Controllability also varies accordingly. That is, for the action of tracing the surface of the already defined shape on the screen, the operating bar is used with counterforce being always applied to the operator's hand, thus achieving a stable movement of the operating bar. For a free movement in a space where no shape is defined, the force sensor 2 or the operating bar 3 is moved in a direction in which no counterforce arises, thus making the action of the operating bar tend to be unstable. If the response speed is lowered, however, the action will become stable, while the operation will be heavy.

In the present invention, therefore, the grasping force sensor 4 mounted on the operating bar for shape information feeding monitors the operator's grasping force during operation. The response characteristics of the servo system are varied in real time such that when the operating bar is moved with a weak grip, the response speed of the servo system acting on the manipulator 1 is raised; whereas when the operation involves a strong grip, the response speed of the servo system is lowered. The response gain of the system is thus changed via the grasping force sensor 4 depending on the grasping force of the operator during inputting. Hence, the system can be characterized in that it is operable gently or carefully in harmony with the operator's feeling.

Figure 3:
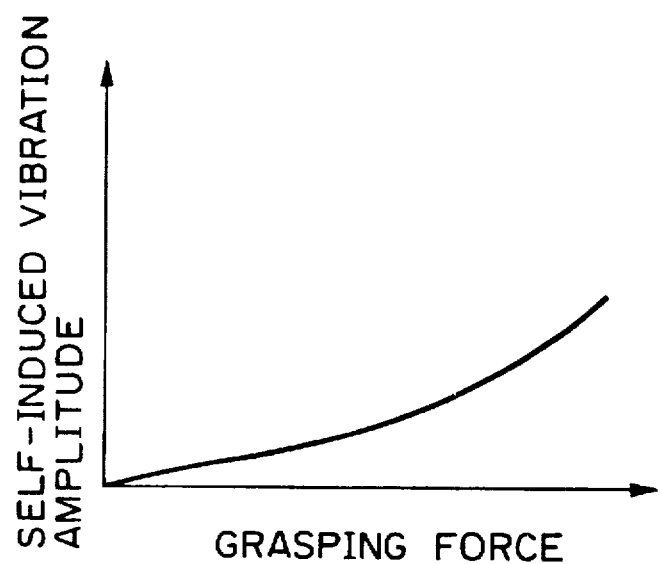
FIG. 3 is a graph showing the relationship between the self-induced vibration amplitude of and the grasping force on the operating bar in a conventional CAD system; a FIG. 4 is a graph showing the relationship between the self-induced vibration amplitude of and the grasping force on the operating bar in the CAD system of the present invention.
Figure 4:
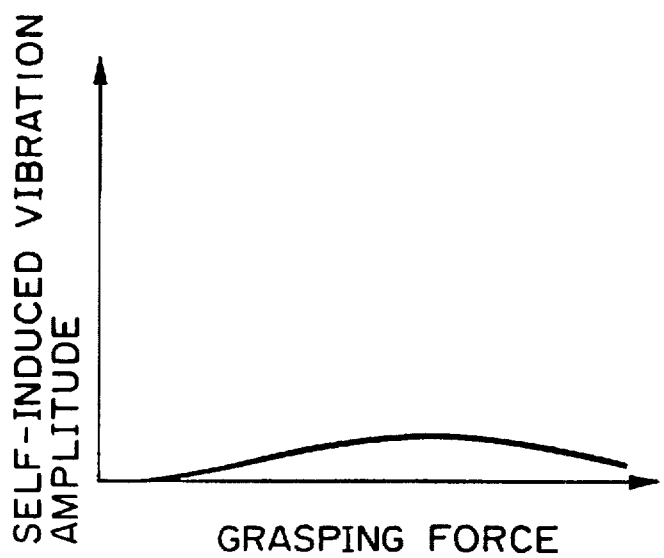

The details are shown in FIGS. 3 and 4. The ordinates of the graph in these drawings represent the self-induced vibration amplitudes of the human and the manipulator. The abscissas represent the magnitude of the grasping force. With a conventional system as shown in FIG. 3, the larger the grasping force is, the more sensitive the response becomes to a slight tremble of the human hand, thus producing a great vibration amplitude. In the present invention, the greater the grasping force, the lower the response speed of the servo system becomes. Thus, the vibration amplitude is not large when the grasping force is great, as shown in FIG. 4. This means that the manipulator grasped by the human hand is stable.

As noted above, the operator's grasping force is constantly monitored so as to fit the operator's feeling, whereby the response characteristics of the manipulator are modified in real time. Thus, when the cursor is moved freely in a space on the computer screen, or when it is moved under force, say, during the action of tracing an already defined shape on the screen, the feeding or correction of the shape can be performed gently, or without generating unnecessary vibrations on the operating bar.

The CAD system of the present invention, as described in detail above, enables the shape to be feeded or corrected, without generating unnecessary vibrations on the operating bar, when the cursor is moved freely in a space on the computer screen, or when it is moved under force, say, during the action of tracing an already defined shape on the screen.

The present invention has been described in detail with respect to a preferred embodiment, and it will now be clear that changes and modifications can be made without departing from the invention in its broader aspects, and it is our intention, therefore, in the appended claims to cover all such changes and modifications as fall within the true spirit of the invention.

What is claimed is:

1. A computer-aided design system comprising:

a three-dimensional shape input device for feeding into a computer three-dimensional shape information on an object to be designed;

a grasping force sensor mounted on the three-dimensional shape input device;

a manipulator connected to the three-dimensional shape input device and driven by a servo system;

a display for visualizing a designing process to be performed via the three-dimensional shape input device; and a controller which is supplied with data of a direction and magnitude of a force applied through the input device by an operator, and which controls the servo system to follow the operator's manual movement so as not to produce counterforce, the controller being supplied with a grasping force signal, measured by the grasping force sensor, during feeding by the three-dimensional shape input device, and which varies the response gain of the servo system of the manipulator on the basis of the grasping force signal.

2. The computer-aided design system as claimed in claim 1, wherein the response gain of the servo system is varied such that when the grasping force is smaller than a predetermined value, the response speed of the servo system is raised, while when the grasping force is larger than the predetermined value, the response speed of the servo system is lowered.

3. The computer-aided design system as claimed in claim 1 wherein the three-dimensional shape input device has an operating control bar, which has the grasping force sensor at its front end.

* * * * *

REEXAMINATION CERTIFICATE (4138th)

United States Patent [19]
Fukui et al.

[11] B1 5,754,433
[45] Certificate Issued Aug. 22, 2000

[54] COMPUTER-AIDED DESIGN SYSTEM

[75] Inventors: Yukio Fukui; Hiroshi Yokoi; Makoto Shimojo, all of Tsukuba, Japan

[73] Assignee: Director-General of Agency of Industrial Science and Technology, Tokyo, Japan

Reexamination Request:
No. 90/005,374, Jul. 7, 1999

Reexamination Certificate for:
Patent No.: 5,754,433
Issued: May 19, 1998
Appl. No.: 08/622,422
Filed: Mar. 27, 1996

[30] Foreign Application Priority Data

Jun. 23, 1995 [JP] Japan ................................ 7-157401

[51] Int. Cl.[7] .......................... G05B 19/00; G06F 17/50; G08C 21/00
[52] U.S. Cl. ......................... 700/182; 700/186; 700/187; 700/245; 700/260; 318/561; 318/566; 318/568.17; 318/628; 414/5; 414/6; 414/909; 345/16; 345/161; 345/163; 345/433; 345/441
[58] Field of Search ..................................... 700/182, 186, 700/187, 188

[56] References Cited

FOREIGN PATENT DOCUMENTS 4-101789  4/1992  Japan .

OTHER PUBLICATIONS

Yamashita et al., Development of 3D-input Device for Virtual Surface Manipulation, Jul. 1994, (all of document).

Juli Yamashita et al. *Japan Industrial Technology Association's Material No. 234*, pp, 201–205. "Our Aim to Provide a Form–Reshaping System of Visual–Tactile Amalgam Type—Direct Form–Reshaping Method—." Nov. 1 & 2, 1993.

*Primary Examiner*—Tariq R. Hafiz

[57] ABSTRACT

The computer-aided design system of the present invention is characterized in that a grasping force sensor 4 is mounted on that operating bar 3 at the front end of a manipulator 1 which is grasped directly and operated by an operator, and that the mechanical response characteristics of the system are varied on the basis of an output from the grasping force sensor 4. That is, the rigidity on the part of the manipulator is increased in response to a high grasping force during operation, since the rigidity of the hand is also high; and the rigidity on the part of the manipulator is decreased for a low grasping force during operation, since the rigidity of the hand is also low. In scenes in which a space on a computer screen defining no shapes is crossed by a cusor on the screen, a weak grip will lower the rigidity on the part of the manipulator, thus achieving the feeling of a smooth operation. If a slight and precise change in the shape on the screen is desired, a firm grip will make the rigidity of the manipulator high, thus achieving meticulous actions of the operating bar with the same external force.

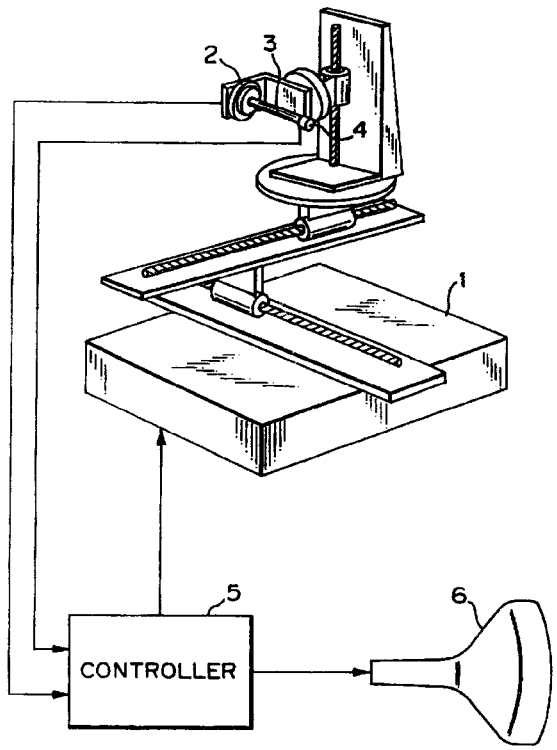

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claim 1 is determined to be patentable as amended.

Claim 3, dependent on an amended claim, is determined to be patentable.

1. A computer-aided design system comprising:

a three-dimensional shape input device for feeding into a computer three-dimensional shape information on an object to be designed;

a grasping force sensor mounted on the three-dimensional shape input device;

a manipulator connected to the three-dimensional shape input device and driven by a servo system;

a display for visualizing a designing process to be performed via the three-dimensional shape input device; and a controller which is supplied with data of a direction and magnitude of a force applied through the input device by an operator, and which controls the servo system to follow the operator's manual movement so as not to produce counterforce, the controller being supplied with a grasping force signal, measured by the grasping force sensor, during feeding by the three-dimensional shape input device, and which varies the response gain of the servo system of the manipulator on the basis of the grasping force signal[.];

*wherein the response gain of the servo system is varied in real time such that the response speed of the servo system is raised as the grasping force becomes smaller, while the response speed of the servo system is lowered as the grasping force becomes larger.*

* * * * *